US011881631B2

(12) United States Patent
Wu et al.

(10) Patent No.: US 11,881,631 B2
(45) Date of Patent: Jan. 23, 2024

(54) ANTENNA

(71) Applicants: Beijing BOE Technology Development Co., Ltd., Beijing (CN); BOE TECHNOLOGY GROUP CO., LTD., Beijing (CN)

(72) Inventors: Qianhong Wu, Beijing (CN); Jingwen Guo, Beijing (CN); Chunxin Li, Beijing (CN); Jia Fang, Beijing (CN); Feng Qu, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 225 days.

(21) Appl. No.: 17/621,126

(22) PCT Filed: Feb. 26, 2021

(86) PCT No.: PCT/CN2021/078020

§ 371 (c)(1),
(2) Date: Dec. 20, 2021

(87) PCT Pub. No.: WO2022/178800

PCT Pub. Date: Sep. 1, 2022

(65) Prior Publication Data

US 2023/0155285 A1 May 18, 2023

(51) Int. Cl.
*H01Q 3/26* (2006.01)
*H01P 1/18* (2006.01)
*H01Q 1/50* (2006.01)

(52) U.S. Cl.
CPC ................. *H01Q 3/26* (2013.01); *H01P 1/18* (2013.01); *H01Q 1/50* (2013.01)

(58) Field of Classification Search
CPC ............ H01Q 3/26; H01Q 1/50; H01Q 9/045; H01Q 21/245; H01P 1/18; H01P 1/184
See application file for complete search history.

(56) References Cited

U.S. PATENT DOCUMENTS 11,631,928 B2 * 4/2023 Li ........................... H01P 11/00 333/157
2005/0178646 A1 8/2005 Hector
2022/0416402 A1 * 12/2022 Choi ........................ H01Q 1/44

FOREIGN PATENT DOCUMENTS

CN 201017323 Y 2/2008
CN 101246981 A 8/2008
EP 1530249 A 5/2005

* cited by examiner

*Primary Examiner* — Seung H Lee
(74) *Attorney, Agent, or Firm* — HOUTTEMAN LAW LLC

(57) ABSTRACT

An antenna includes: a substrate; a first reference electrode on a first surface of the substrate; a radiating element on a second surface of the substrate, feeding directions of a first port and a second port of the radiating element are different; and at least one transmission structure on the second surface of the substrate and connected to at least one of the first port and the second port. The transmission structure includes: a signal electrode, a second reference electrode on at least one side of the signal electrode, and at least one membrane bridge; the signal electrode feeds a microwave signal into the radiating element, is positioned in a space surrounded by the membrane bridge and the substrate, and is insulated from the membrane bridge through an interlayer dielectric layer; orthographic projections of the membrane bridge and the second reference electrode on the substrate are overlapped.

20 Claims, 9 Drawing Sheets

ANTENNA

TECHNICAL FIELD

The present disclosure relates to the field of communication technology, and particularly relates to an antenna.

BACKGROUND

Polarization agile antennas refer to antennas whose polarization state can be constantly changed. In recent years, with the rapid development of wireless communication, the transmission rate of information is increasing, and the demand for spectrum resources is also increasing. For this, polarization diversity technology can be used to transmit two signals through two orthogonal polarization modes, so that frequency band resources can be saved. By designing the polarization agile antenna, the switching of multiple polarization modes can be realized by using as few antennas as possible (for example, only one antenna is used), so that a size and a weight of the antenna are greatly reduced, and the cost of a radio frequency system is reduced.

SUMMARY

The present disclosure is directed to solve at least one of problems of the related art and provides an antenna.

A technical solution adopted for solving the technical problem of the present disclosure is an antenna, which includes: a substrate having a first surface and a second surface oppositely disposed;

- a first reference electrode arranged on the first surface of the substrate;
- a radiating element arranged on the second surface of the substrate, and feeding directions of a first port and a second port of the radiating element are different;
- at least one transmission structure arranged on the second surface of the substrate, and connected to at least one of the first port and the second port of the radiating element; where
- the transmission structure includes a signal electrode, a second reference electrode arranged on at least one side of the signal electrode in an extending direction of the signal electrode, and at least one membrane bridge; the signal electrode is configured to feed a microwave signal into the radiating element, is positioned in a space surrounded by the membrane bridge and the substrate, and is insulated from the membrane bridge through an interlayer dielectric layer; an orthographic projection of the membrane bridge on the substrate overlaps with an orthographic projection of the second reference electrode on the substrate.

In some implementations, the first port and the second port of the radiating element are connected to transmission structures one-to-one.

In some implementations, the second reference electrode includes a first sub-electrode and a second sub-electrode, the first sub-electrode and the second sub-electrode are respectively arranged on two sides of the signal electrode in the extending direction of the signal electrode; the transmission structure includes a bridge deck, a first connection portion and a second connection portion; one end of the first connection portion is connected to the bridge deck, and another end of the first connection portion is positioned on a side, away from the substrate, of the first sub-electrode, and an orthographic projection of the first connection portion on the substrate at least partially overlaps with an orthographic projection of the first sub-electrode on the substrate; one end of the second connection portion is connected to the bridge deck, and another end of the second connection portion is positioned on a side, away from the substrate, of the second sub-electrode, and an orthographic projection of the second connection portion on the substrate at least partially overlaps with an orthographic projection of the second sub-electrode on the substrate.

In some implementations, the first connection portion is in contact with the first sub-electrode, and the second connection portion is in contact with the second sub-electrode.

In some implementations, the second reference electrode is located only on one side of the signal electrode in the extending direction thereof; the membrane bridge includes a bridge deck and a connection portion, one end of the connection portion is connected with the bridge deck, and anther end of the connection portion is positioned on a side, away from the substrate, of the first sub-electrode and an orthographic projection of the connection portion on the substrate at least partially overlaps with an orthographic projection of the first sub-electrode on the substrate; or one end of the connection portion is connected with the bridge deck, another end of the connection portion is positioned on a side, away from the substrate, of the second sub-electrode, and an orthographic projection of the connection portion on the substrate at least partially overlaps with an orthographic projection of the second sub-electrode on the substrate.

In some implementations, the connection portion is in contact with the second reference electrode.

In some implementations, there is one membrane bridge provided in each transmission structure.

In some implementations, there are a plurality of membrane bridges provided in each transmission structure, and the plurality of membrane bridges are spaced apart.

In some implementations, there are a plurality of membrane bridges provided in each transmission structure, and one of the plurality of membrane bridges has a bridge deck with a first width, and each of the remaining membrane bridges has a bridge deck with a second width, and the first width is greater than the second width; the membrane bridges each having the bridge deck with the second width are located on a same side of the membrane bridge having the bridge deck with the first width.

In some implementations, a feeding direction of one of the first port and the second port in the radiating element is a vertical direction, and a feeding direction of the other one of the first port and the second port in the radiating element is a horizontal direction.

In some implementations, the radiating element, the signal electrode, the first reference electrode, the second reference electrode are arranged in a same layer.

In some implementations, a material of the substrate includes any one of glass, polyimide, or polyethylene terephthalate.

DRAWINGS

DETAILED DESCRIPTION

In order to make the technical solutions of the present disclosure better understood, the present disclosure is further described in detail with reference to the accompanying drawings and the detailed description below.

Unless defined otherwise, technical or scientific terms used herein shall have the ordinary meaning as understood by one of ordinary skill in the art to which the present disclosure belongs. The use of "first," "second," and the like in the present disclosure is not intended to indicate any order, quantity, or importance, but rather is used to distinguish one element from another. Also, the use of the words "a," "an," or "the" and similar referents do not denote a limitation of quantity, but rather denote the presence of at least one. The word "comprising" or "including", and the like, means that the element or item preceding the word includes the element or item listed after the word and its equivalent, but does not exclude other elements or items. The terms "connected" or "coupled" and the like are not restricted to physical or mechanical connections, but may include electrical connections, whether direct or indirect. Terms "upper", "lower", "left", "right", and the like are used only to indicate relative positional relationships, and when the absolute position of the object being described is changed, the relative positional relationships may also be changed accordingly.

Figure 1:
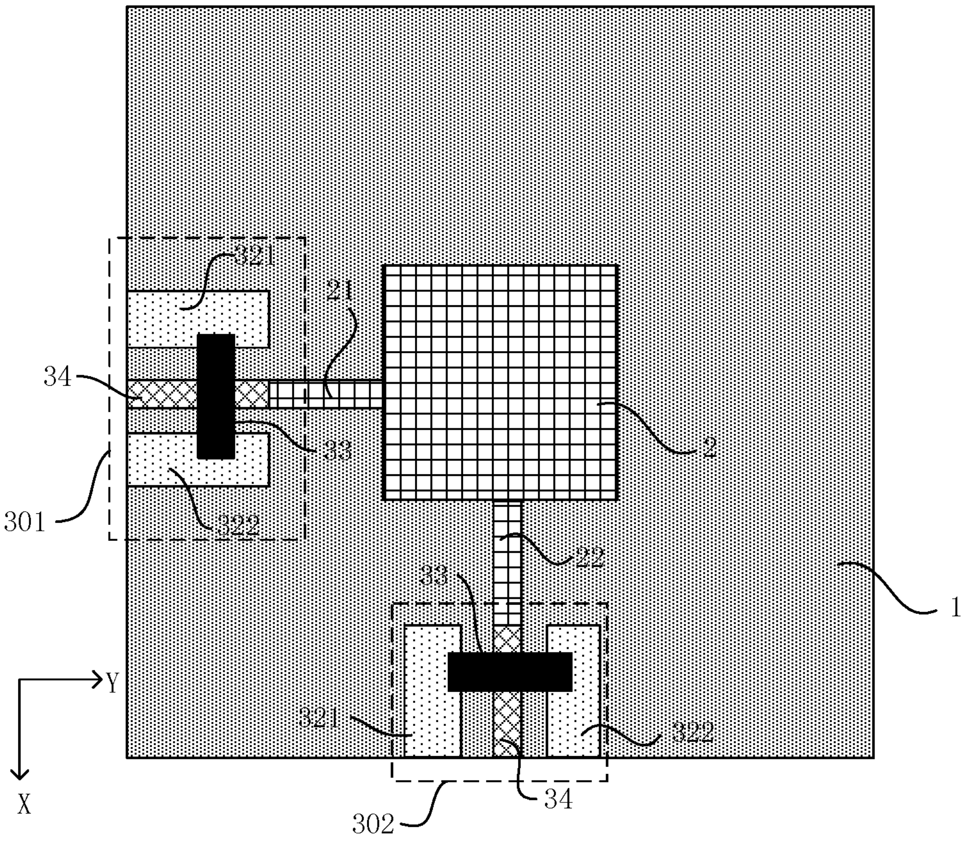
FIG. 1 is a top view of an antenna according to an embodiment of the present disclosure.
Figure 2:
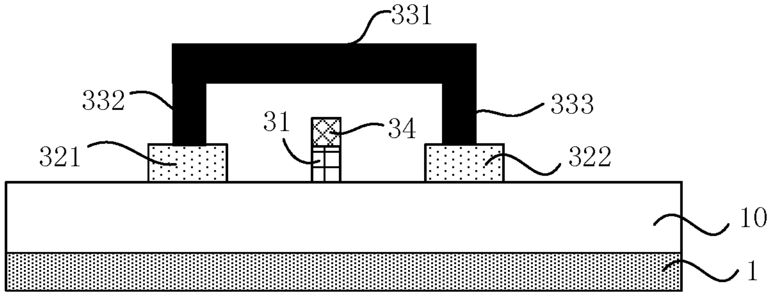
FIG. 2 is a cross-sectional view of a transmission structure according to an embodiment of the present disclosure.

In a first aspect, FIG. 1 is a top view of an antenna according to an embodiment of the present disclosure; FIG. 2 is a cross-sectional view of a transmission structure according to an embodiment of the present disclosure. As shown in FIGS. 1 and 2, the present disclosure provides an antenna including a substrate 10, a first reference electrode 1, a radiating element 2, and at least one transmission structure.

The substrate 10 has a first surface (lower surface) and a second surface (upper surface) opposite to each other, and a material of the substrate may be a hard material, such as a glass based material, or a flexible material, such as polyimide, polyethylene terephthalate, or the like. The material of the substrate 10 is not limited in the embodiment of the present disclosure.

The first reference electrode 1 is arranged on the first surface of the substrate 10, for example, the first reference electrode 1 is of a plate-shaped structure and covers the first surface of the substrate 10. The first reference electrode 1 in the present embodiment includes, but is not limited to, a ground electrode, i.e., a potential written into the first reference electrode 1 is a ground potential.

The radiating element 2 is arranged on the second surface of the substrate 10, and feeding directions of a first port 21 and a second port 22 of the radiating element 2 are different, for example, the feeding direction of one of the first port 21 and the second port 22 of the radiating element 2 is a vertical direction, and the feeding direction of the other one of the first port 21 and the second port 22 of the radiating element 2 is a horizontal direction. It should be noted that the horizontal direction and the vertical direction in the present embodiment refer to a direction along an x axis and a direction along a y axis, respectively. In the present embodiment, a case where a polarization direction of the first port 21 of the radiating element 2 shown in FIG. 1 being the horizontal direction, i.e., a direction of 0°, and a polarization direction of the second port 22 of the radiating element 2 shown in FIG. 1 is the vertical direction, i.e., a direction of 90°, is taken as an example for explanation.

The transmission structure is arranged on the second surface of the substrate 10 and at least one of the first port 21 and the second port 22 of the radiating element 2 is connected to the transmission structure. The transmission structure in the present embodiment includes a signal electrode 31, a second reference electrode 32 and at least one membrane bridge 33; the signal electrode 31 and the second reference electrode 32 form a coplanar waveguide (CPW) transmission line, and the membrane bridge 33 is equivalent to a micro electromechanical system (MEMS) switch. The second reference electrode 32 includes, but is not limited to, a ground electrode; the signal electrode 31 is configured to feed a microwave signal to the radiating element 2, for example, when the first port 21 of the radiating element 2 is connected to the transmission structure, the signal electrode 31 of the transmission structure is connected to the first port 21 of the radiating element 2, and when the second port 22 of the radiating element 2 is connected to the transmission structure, the signal electrode 31 of the transmission structure is connected to the second port 22 of the radiating element 2. The second reference electrode 32 is positioned on at least one side of the signal electrode 31 in an extending direction (lengthwise direction) of the signal electrode, i.e., in a direction in which the signal electrode extends, and the membrane bridge 33 is located on a side, away from the substrate 10, of a layer where the signal electrode 31 and the second reference electrode 32 are located; the signal electrode 31 is located in a space surrounded by the membrane bridge 33 and the substrate 10, and the signal electrode 31 and the membrane bridge 33 are insulated from each other by an interlayer dielectric layer 34; an orthographic projection of the membrane bridge 33 on the substrate 10 overlaps with an orthographic projection of the second reference electrode 32 on the substrate 10. In such case, by designing a width of the membrane bridge 33 and a number of membrane bridges 33 and controlling a direct current (DC) bias voltage applied to the signal electrode 31 and the membrane bridges 33 to control the membrane bridge 33 to move toward the substrate 10, variation of transmission characteristics of the microwave signal is realized, thereby realizing the antenna having different polarization directions. The description is specifically made with reference to the following implementations.

With continued reference to FIG. 1, in the embodiment of the present disclosure, for example, each of the first port 21 and the second port 22 of the radiating element 2 is connected with the transmission structure. For convenience of description, the transmission structure connected to the first port 21 of the radiating element 2 is referred to as a first transmission structure 301, and the transmission structure connected to the second port 22 of the radiating element 2 is referred to as a second transmission structure 302.

In an example, with continued reference to FIGS. 1 and 2, the first transmission structure 301 and the second transmission structure 302 in the antenna each include a signal electrode 31, a second reference electrode 32, a membrane bridge 33, and an interlayer dielectric layer 34 located on a side of the signal electrode 31 away from the substrate 10. For the first transmission structure 301, the signal electrode 31 and the first port 21 of the radiating element 2 are disposed in a same layer and are formed into one piece. The second reference electrode 32 includes a first sub-electrode 321 and a second sub-electrode 322 respectively disposed at two sides of the signal electrode 31 in a length direction of the signal electrode 31, for example, the length direction of the signal electrode 31 is parallel to length directions of the first sub-electrode 321 and the second sub-electrode 322. The membrane bridge 33 includes a bridge deck 331 and a first connection portion 332 and a second connection portion 333 respectively connected to two ends of the bridge deck 331, an orthographic projection of the first connection portion 332 on the substrate 10 at least partially overlaps with an orthographic projection of the first sub-electrode 321 on the substrate 10, for example, the orthogonal projection of the first connection portion 332 on the substrate 10 is located within the orthogonal projection of the first sub-electrode 321 on the substrate 10; an orthogonal projection of the second connection portion 333 on the substrate 10 at least partially overlaps an orthogonal projection of the second sub-electrode 322 on the substrate 10. In some examples, the interlayer dielectric layer 34 is also disposed between the first connection portion 332 and the first sub-electrode 321, and between the second connection portion 333 and the second sub-electrode 322. In some examples, the first connection portion 332 may be in direct contact with the first sub-electrode 321, and the second connection portion 333 may be in direct contact with the second sub-electrode 322, in such case, the membrane bridge 33 and the second reference electrode 32 are maintained at a same potential, so that there is no need to apply a DC voltage to the membrane bridge 33 separately, and the membrane bridge 33 can be controlled to move to a plane where the substrate 10 is located by only applying a DC voltage to the signal electrode 31. In the embodiment of the present disclosure, description is made by taking the first connection portion 332 being in direct contact with the first sub-electrode 321, and the second connection portion 333 being in direct contact with the second sub-electrode 322 as an example.

The second transmission structure 302 is similar to the first transmission structure 301, except that the signal electrode 31 in the second transmission structure 302 is connected to the second port 22 of the radiating element 2, for example, the signal electrode 31 and the second port 22 of the radiating element 2 are disposed in a same layer and are formed into one piece. Furthermore, the signal electrode 31 of the first transmission structure 301, the signal electrode 31 of the second transmission structure 302 and the radiating element 2 all may be disposed in a same layer and are formed into one piece.

Figure 3:
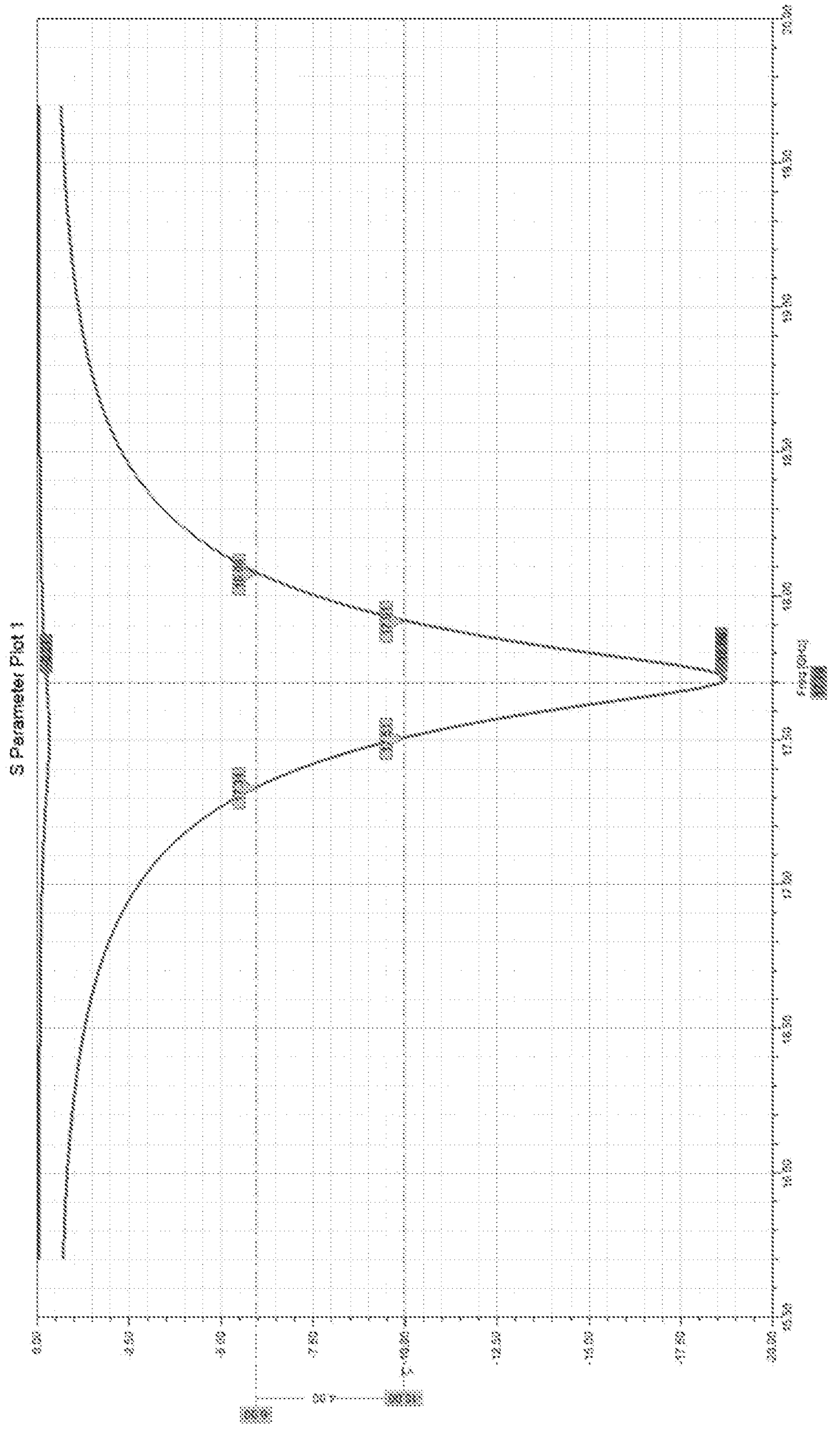
FIG. 3 is a S-parameter plot of a first port and a second port of the antenna shown in FIG. 1 obtained from a simulation by applying a voltage only to a second transmission structure connected to the second port.
Figure 4:
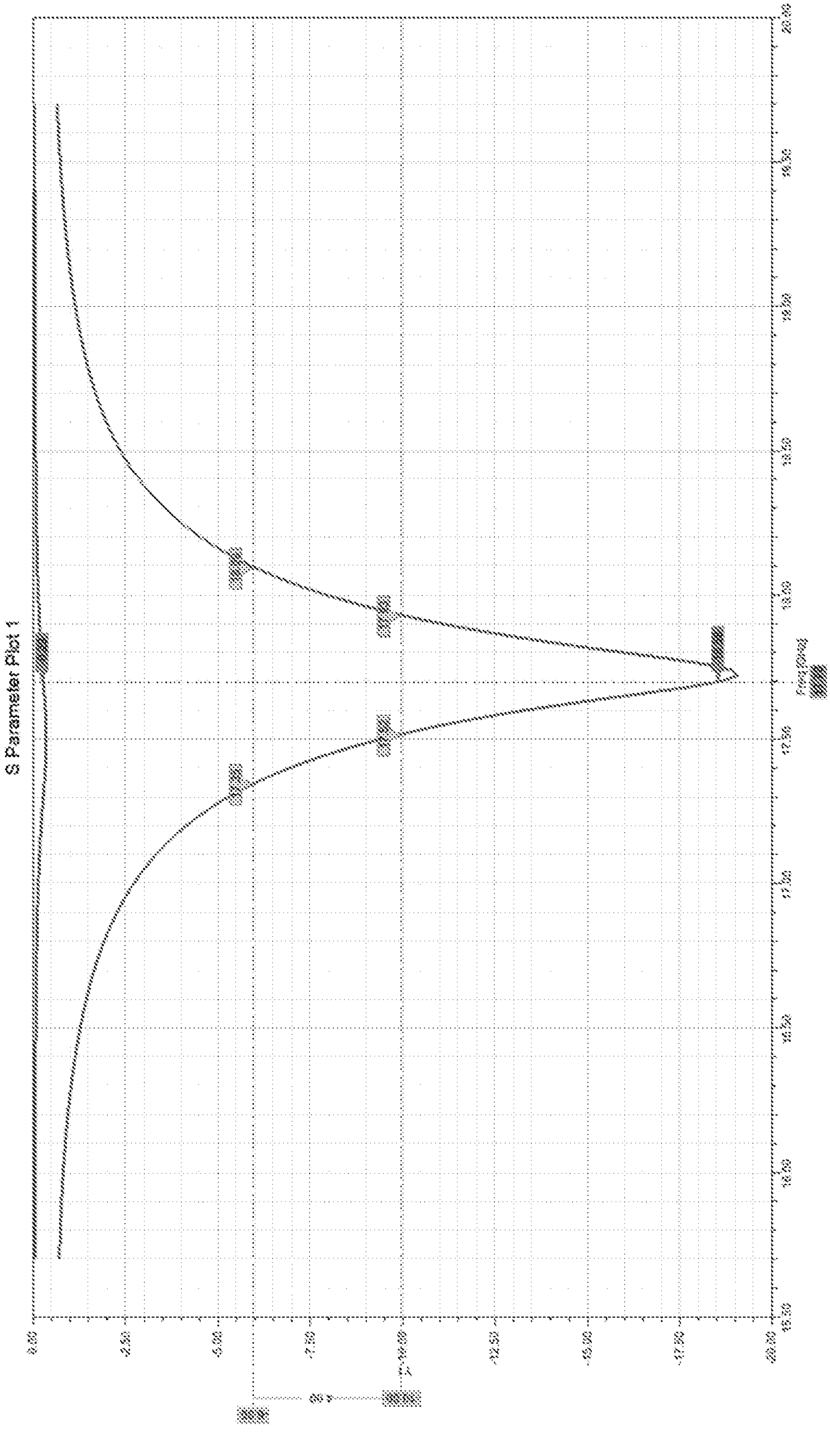
FIG. 4 is a S-parameter plot of a first port and a second port of the antenna shown in FIG. 1 obtained from a simulation by applying a voltage only to a first transmission structure connected to the first port.
Figure 5:
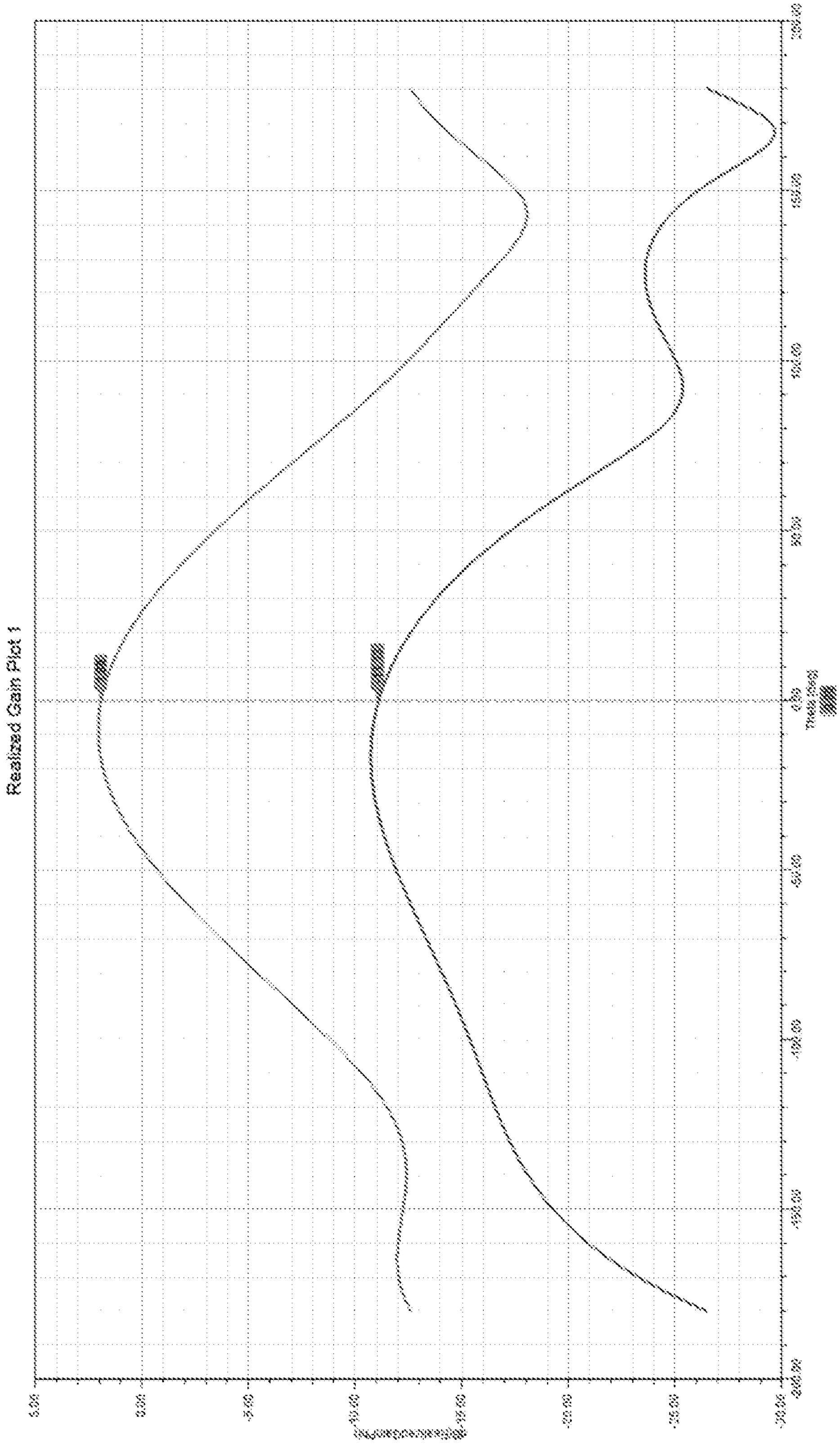
FIG. 5 is a plane directional diagram of the antenna shown in FIG. 1, which is obtained from a simulation by applying a voltage only to the second transmission structure connected to the second port.
Figure 6:
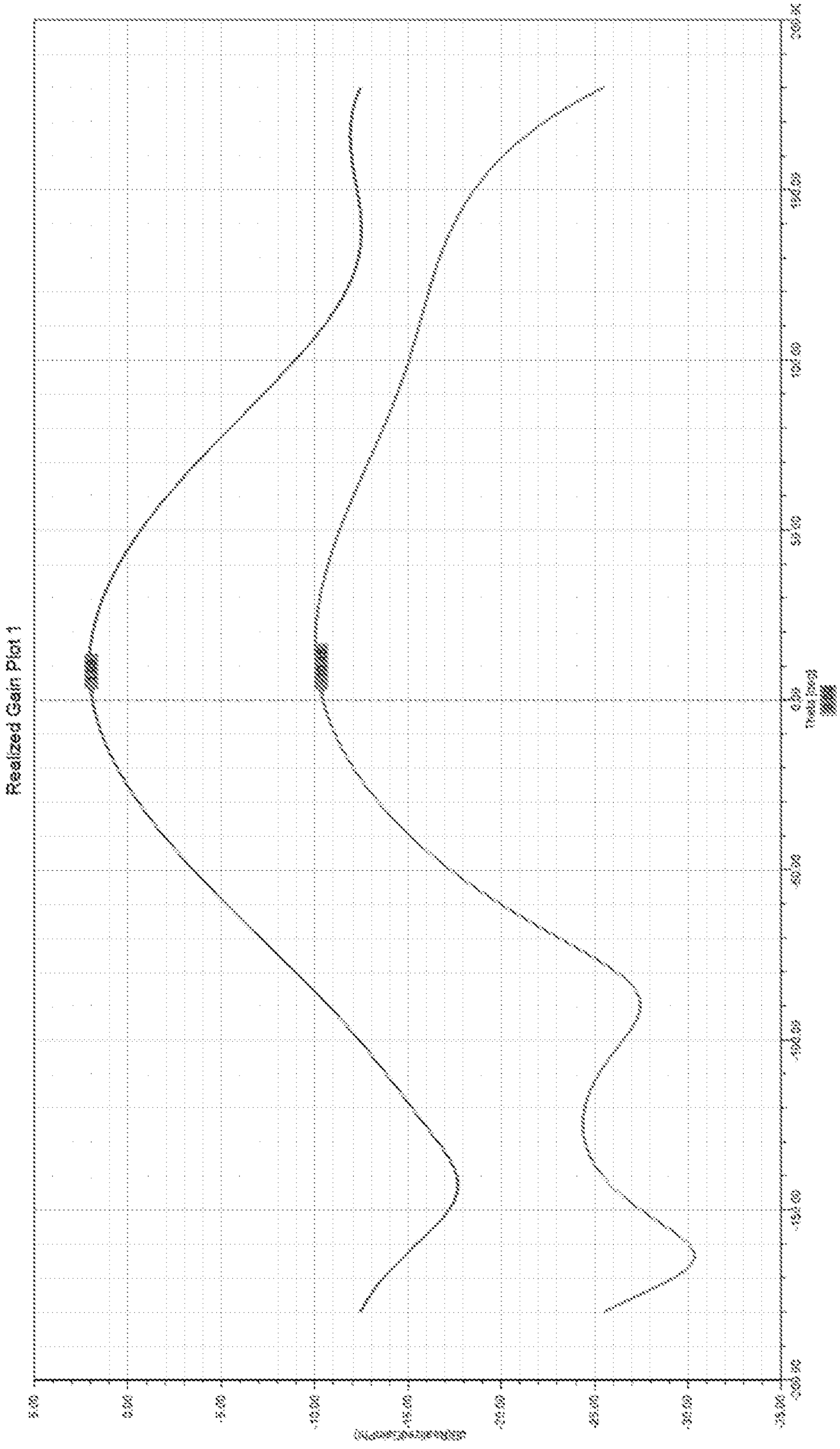
FIG. 6 is a plane directional diagram of the antenna shown in FIG. 1, which is obtained from a simulation by applying a voltage only to the first transmission structure connected to the first port.

With continued reference to FIG. 1, the membrane bridge 33 in each of the first transmission structure 301 and the second transmission structure 302 includes one bridge deck 331 which is relative wide, and the width of the bridge deck 331 is not less than 0.1 mm, for example, the bride deck 331 of the membrane bridge 33 has a width of 0.1 mm. In such case, a DC bias voltage is applied between the first sub-electrode 321, the second sub-electrode 322 and the signal electrode 31, when the DC bias voltage is greater than a driving voltage of the membrane bridge, the membrane bridge 33 starts to be pulled down in a direction approaching to the substrate 10 under an action of electrostatic force, when a magnitude of the DC bias voltage is increased, the membrane bridge 33 is gradually pulled down until the membrane bridge is attached to the interlayer dielectric layer 34 on the signal electrode 31, a state in which the bridge deck 331 of the membrane bridge 33 is attached to the interlayer dielectric layer 34 is called a down state, an initial state of the bridge deck of the membrane bridge 33 is called an up state, and electromagnetic wave transmission characteristics corresponding to the down state and the up state are different. It should be noted that the magnitude of the voltage applied to the membrane bridge 33 mentioned below is a magnitude of a voltage that can change the membrane bridge 33 from the up state to the down state. When the bridge deck 331 of the membrane bridge 33 is relatively wide or a span of the membrane bridge is relatively large, insertion losses of the first transmission structure 301 and the second transmission structure 302 are very small when the membrane bridge 33 is in the up state, and the insertion losses of the first transmission structure 301 and the second transmission structure 302 is very large when the membrane bridge 33 is in the down state, so that the up state and the down state of the membrane bridge can be respectively used as a turned-on state and a turned-off state of a switch, realizing turned-on or turned-off of a circuit. The 0°/90° linear polarization agile antenna utilizes such switching characteristics of the first transmission structure 301 and the second transmission structure 302. FIG. 3 is a S-parameter plot of the first port 21 and the second port 22 of the antenna shown in FIG. 1 obtained from a simulation by applying a voltage only to the second transmission structure 302 connected to the second port 22. FIG. 4 is a plot of S-parameters of the first port 21 and the second port 22 of the antenna shown in FIG. 1 obtained from a simulation by applying a voltage only to the first transmission structure 301 connected to the first port 21. FIG. 5 is a plane directional diagram of the antenna shown in FIG. 1, which is obtained from a simulation by applying a voltage only to the second transmission structure 302 connected to the second port 22. FIG. 6 is a plane directional diagram of the antenna shown in FIG. 1, which is obtained from a simulation by applying a voltage only to the first transmission structure 301 connected to the first port 21. The first port 21 and the second port 22 are as shown in FIGS. 3 to 6, when a DC bias voltage is applied only between the first sub-electrode 321, the second sub-electrode 322 and the signal electrode 31 in the second transmission structure 302 connected to the second port 22 of the radiating element 2, frequency bands corresponding to S11<−6 dB and S11<−10 dB are 17.34 GHz to 18.08 GHz and 17.51 GHz to 17.91 GHz, respectively, the first transmission structure 301 is in a turned-on state, the first port 21 of the radiating element 2 is electrically connected, i.e., in a turned-on state, but a relatively poor S22 parameter is caused, and is only −0.27 dB at 17.7 GHz, since the DC bias voltage is applied between the first sub-electrode 321, the second sub-electrode 322 and the signal electrode 31 in the second transmission structure 302 connected to the second port 22 of the radiating element 2, in such case, the bridge deck 331 of the membrane bridge 33 in the second transmission structure 302 is in the down state, that is, the second transmission structure 302 is in a turned-off state, the second port 22 of the radiating element 2 is electrically disconnected, i.e., in a turned-off state. In this case, maximum gains of planes, with ϕ=0° and ϕ=90°, of the antenna are 1.88 dB and −11.13 dB, respectively, corresponding to 3 dB beam widths of 85° and 93° respectively, and the polarization state of the antenna is 0° linear polarization. When a DC bias voltage is applied to only the first sub-electrode 321, the second sub-electrode 322 and the signal electrode 31 in the first transmission structure 301 connected to the first port 21 of the radiating element 2, a relatively poor S11 parameter is caused, and is only −0.29 dB at 17.7 GHz, the bridge deck 331 of the membrane bridge 33 in the first transmission structure 301 is in the down state, that is, the first transmission structure 301 is in a turned-off state, so that the first port 21 of the radiating element 2 is electrically disconnected, i.e., in a turned-off state, frequency bands corresponding to S22<−6 dB and S22<−10 dB are respectively 17.35 GHz to 18.09 GHz and 17.52 GHz to 17.93 GHz, and the second transmission structure 302 is in a turned-on state, so that the second port 22 of the radiating element 2 is electrically connected, i.e., in a turned-on state. In such case, maximum gains of the planes, with ϕ=0° and ϕ=90°, respectively, of the antenna are −10.45 dB and 1.89 dB, respectively, corresponding to 3 dB beam widths of 85° and 93° respectively, and the polarization state of the antenna is 90° linear polarization. The agility of the 0°/90° linear polarization can be achieved only by controlling voltage application states of the first transmission structure 301 and the second transmission structure 302.

In a specific example, in the antenna of FIG. 1, the substrate 10 has a dimension of 9.85 mm*9.85 mm*0.5 mm; the radiating element 2 (without the first port 21 and the second port 22) has a dimension of 3.45 mm*3.45 mm*0.001 m; the first transmission structure 301 is the same as the second transmission structure 302, and a line width of the signal electrode 31 is 0.03 mm; the first sub-electrode 321 and the second sub-electrode 322 each have a line width of 2 m and a line length of 1 mm; the bridge deck 331 of the membrane bridge 33 has a line width of 0.1 mm and a line length (span) of 0.2 mm. A distance between the first sub-electrode 321 and the signal electrode 31 and a distance between the second sub-electrode 322 and the signal electrode 31 each are 0.055 mm. Certainly, for antennas of different sizes, sizes of respective film structures thereof need to be specifically defined.

Figure 7:
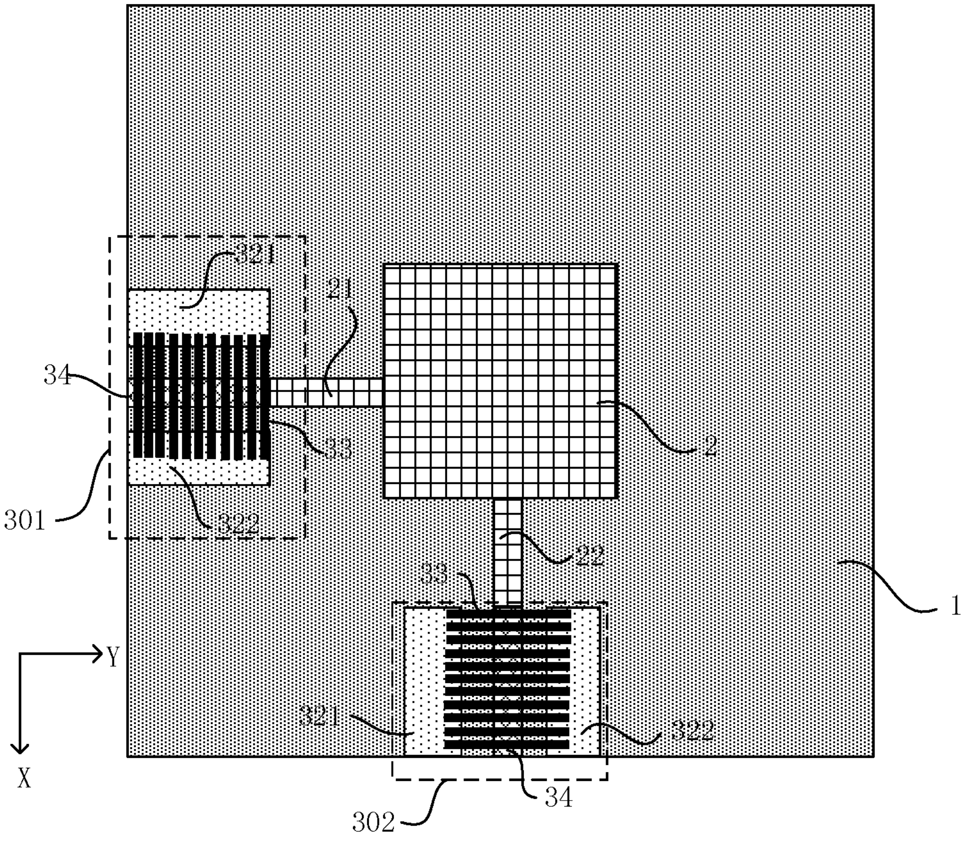
FIG. 7 is a top view of an antenna according to an embodiment of the present disclosure.

In another example, FIG. 7 is a top view of an antenna of an embodiment of the present disclosure; as shown in FIG. 7, the structure of the antenna is substantially the same as that of the antenna shown in FIG. 1, except for the number of the membrane bridges 33 and the width of each membrane bridge in the first transmission structure 301 and the second transmission structure 302. In the present embodiment, the first transmission structure 301 and the second transmission structure 302 each include a plurality of membrane bridges 33, and the width of each of the membrane bridges 33 is relatively narrow, which is approximately 0.02 mm, and the number of the membrane bridges 33 may be 10. The remaining structure of the antenna in FIG. 7 is the same as that in FIG. 1, and thus, the description thereof is not repeated.

With reference to FIG. 7, in the antenna, a width of the bridge deck 331 of the membrane bridge 33 is relatively narrow, in such case, insertion loss of the bridge deck 331 of the membrane bridge 33 in the down state and insertion loss of the bridge deck 331 of the membrane bridge 33 in the up state are both relatively small, and the pulling down of the bridge deck 331 of the membrane bridge 33 mainly causes a change in capacitance between the bridge deck 331 of the membrane bridge 33 and the signal electrode 31, so as to change transmission speed of the microwave signal, further change transmission phase and implement a phase shift. By connecting a suitable number of membrane bridges 33 in series, a phase shift of 90° and 180° may be achieved. A −45°/+45° linear polarization agile antenna based on the first transmission structure 301 and the second transmission structure 302 utilizes a 180° phase shift of the membrane bridge 33.

Figure 8:
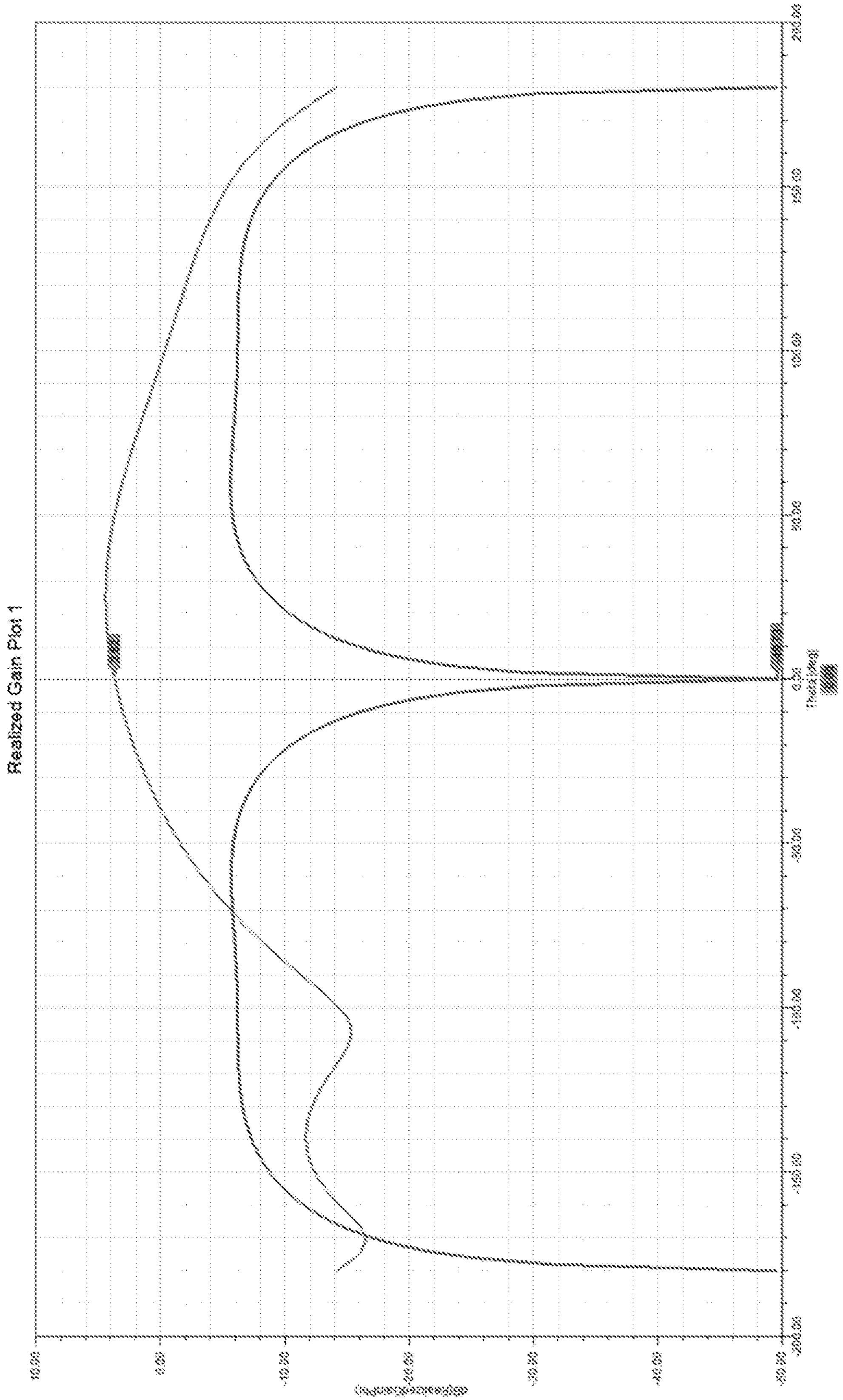
FIG. 8 is a plane directional diagram of the antenna shown in FIG. 7, which is obtained from a simulation without applying a voltage to membrane bridges in the first transmission structure and the second transmission structure.
Figure 9:
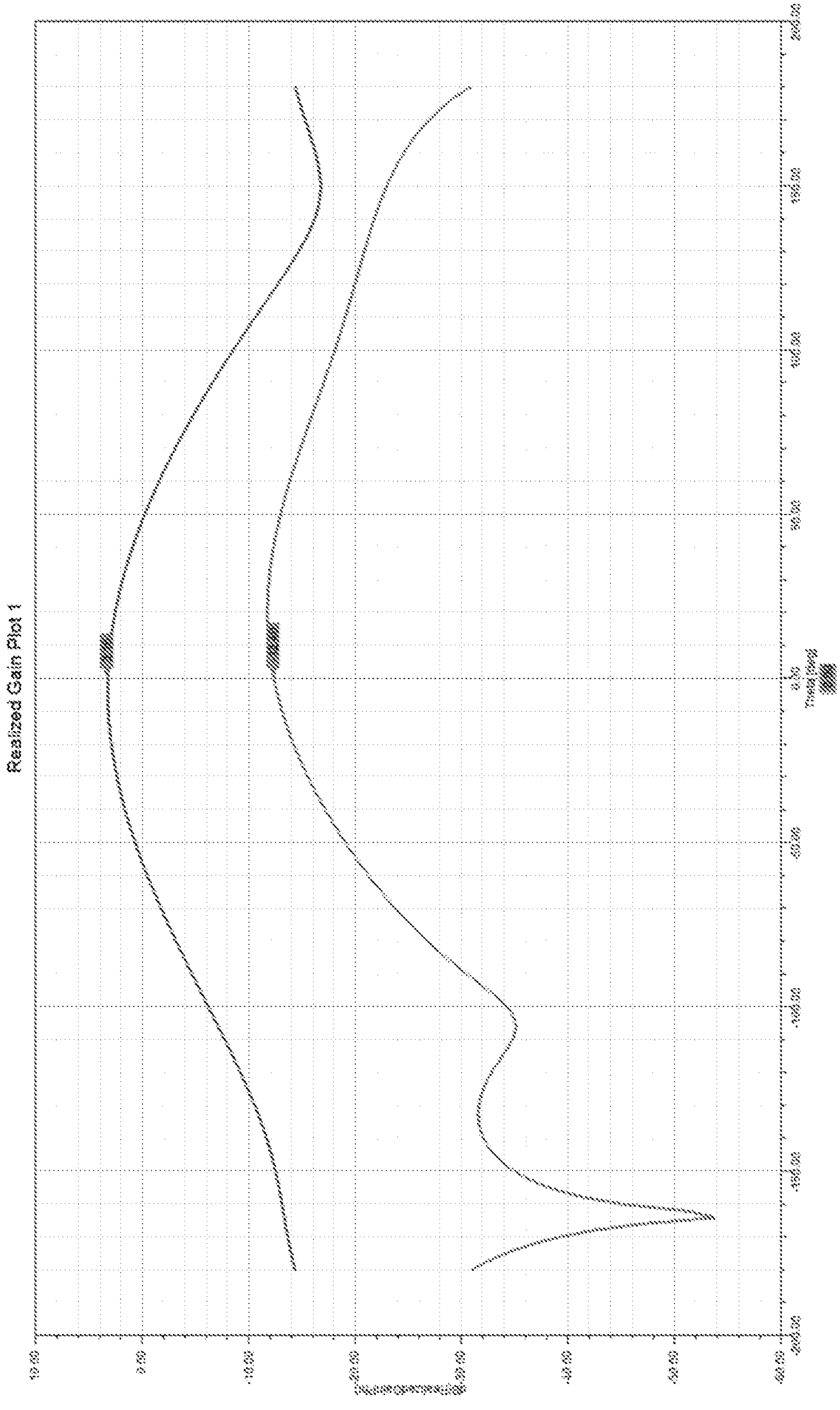
FIG. 9 is a plane directional diagram of the antenna shown in FIG. 7 obtained from a simulation by applying a voltage only to the second transmission structure connected to the second port.

FIG. 8 is a plane directional diagram of the antenna shown in FIG. 7, which is obtained from a simulation without applying a voltage to the membrane bridges 33 in the first transmission structure 301 and the second transmission structure 302. As shown in FIG. 8, when no voltage is applied to the membrane bridges 33 in the first transmission structure 301 and the second transmission structure 302, the maximum gains of planes, with ϕ=−45° and ϕ=+45°, of the antenna are 3.62 dB and −49.73 dB, respectively, corresponding to 3 dB beam widths of 108° and 76°, and the polarization state of the antenna is −45° linear polarization. FIG. 9 is a plane directional diagram of the antenna shown in FIG. 7 obtained from a simulation by applying a voltage only to the second transmission structure 302 connected to the second port 22; as shown in FIG. 9, when a voltage is applied to only the first sub-electrode 321, the second sub-electrode 322, and the signal electrode 31 of the second transmission structure 302 connected to the second port 22, the maximum gains of the planes, with ϕ=−45° and ϕ=+45°, respectively, of the antenna are −12.40 dB and 3.16 dB, respectively, corresponding to 3 dB beam widths of 93° and 81°, and the polarization state of the antenna is +45° linear polarization. The agility of the −45°/+45° linear polarization can be achieved by only controlling voltage application states of the first sub-electrode 321, the second sub-electrode 322 and the signal electrode 31 of the second transmission structure 302 connected to the second port 22.

Similarly, a left-hand circular polarization/right-hand circular polarization agile antenna may also be implemented by using a structure similar to that of FIG. 5, it is only desirable to reduce the number of the membrane bridges 33 connected in series by half (for example, 5). By controlling only the voltage input by the first transmission structure 301 connected to the first port 21 to be switched off or the voltage input by the second transmission structure 302 connected to the second port 22 to be switched off, a phase difference of ±90° between the first port 21 and the second port 22 of the radiating element 2 can be achieved, so that the agilities of the left-hand circular polarization and the right-hand circular polarization can be achieved.

Figure 10:
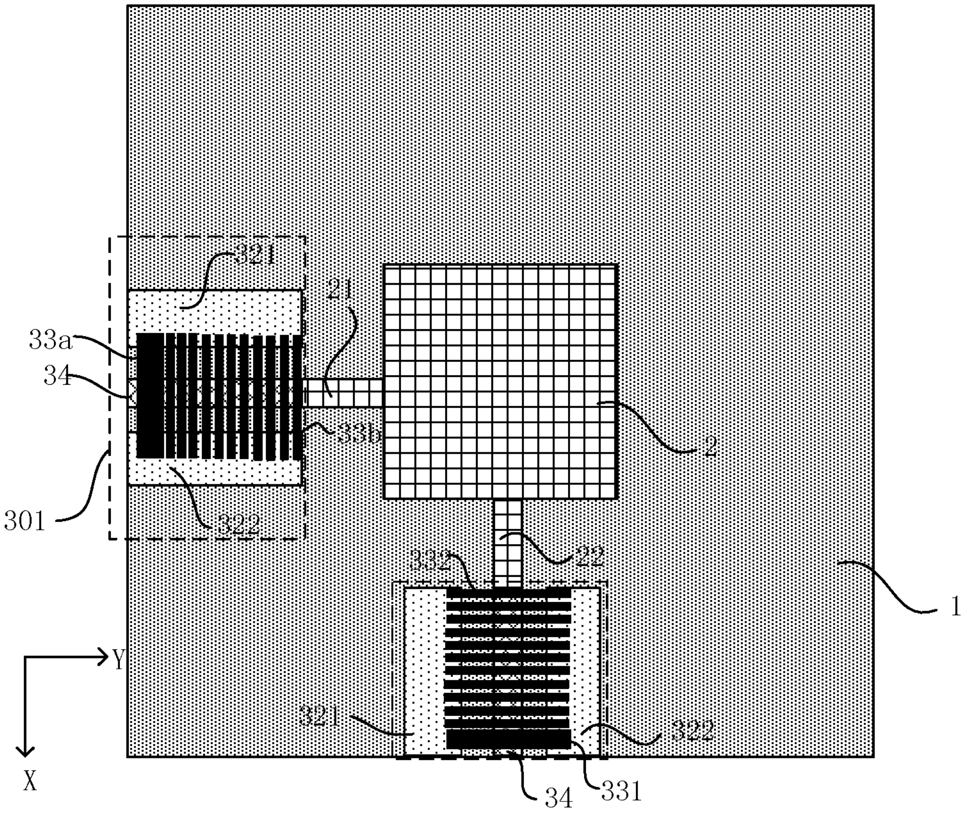
FIG. 10 is a top view of an antenna according to an embodiment of the present disclosure.

In another example, FIG. 10 is a top view of an antenna of an embodiment of the present disclosure; as shown in FIG. 10, the antenna has a structure substantially similar to those of the antennas shown in FIGS. 1 and 7, except that the first transmission structure 301 and the second transmission structure 302 each include membrane bridges 33*a* and 33*b* having bridge decks with two widths respectively, and the interlayer dielectric layer 34 is provided between the first connection portion 332 of the membrane bridge 33 and the first sub-electrode 321, and between the second connection portion 333 of the membrane bridge 33 and the second sub-electrode 322. The remaining structures of the antenna in FIG. 10 are substantially the same as those in FIGS. 1 and 7, and therefore, the description thereof is not repeated.

Specifically, referring to FIG. 10, the first transmission structure 301 and the second transmission structure 302 each include one membrane bridge 33*a* having a bridge deck 331 with a first width and a plurality of membrane bridges 33*b* each having a bridge deck 331 with a second width, the first width being greater than the second width, and the plurality of membrane bridges 33*a* each having the bridge deck 331 with the second width being located on a same side of the membrane bridge 33*b* having the bridge deck 331 with the first width, and FIG. 10 exemplifies that the plurality of membrane bridges 33*b* each having the bridge deck 331 with the second width being located on a side of the membrane bridge 33*a* having the bridge deck 331 with the first width close to the radiating element 2. That is, the membrane bridges 33 in the first transmission structure 301 and the second transmission structure 302 each include two portions, one of which is the membrane bridge 33*a* having the bridge deck 331 being wider, and the other of which is formed by the plurality of membrane bridges 33*b*, each having the bridge deck 331 being narrower, connected in series; in such case, by controlling the DC bias voltage applied to the membrane bridge 33*a* having the bridge deck 331 being wider, the switching between two states of "turned-on" and "turned-off" of the first and second transmission structures can be controlled; the DC bias voltage applied to the plurality of the membrane bridges 33*b* each having the bridge deck 331 being narrower can also be controlled to perform a phase shifting on the microwave signal, and a 90°/180° phase shifting can be realized. In addition, since the interlayer dielectric layer 34 is disposed between each of the membrane bridges 33*a* and 33*b* and the first and second sub-electrodes 321 and 322, each membrane bridge 33 can be independently controlled, and in this case, the left-hand/right-hand circular polarization agile antenna can be implemented by controlling the number of the membrane bridges 33 each having the bridge deck 331 being narrower to which the DC bias voltage is applied.

For example, a DC bias voltage is applied only between the membrane bridge 33*a* and the signal electrode 31 in the second transmission structure connected to the second port 22 of the radiating element 2, and in such case, the bridge deck 331 with the first width in the second transmission structure 302 is in a down state, that is, the second transmission structure 302 is in a turned-off state, so that the second port 22 of the radiating element 2 is electrically disconnected, i.e., in a turned-off state, and the first transmission structure 301 is in a turned-on state, so that the first port 21 of the radiating element 2 is electrically connected, i.e., in a turned-on state, and the polarization state of the antenna is 0° linear polarization.

For example, a DC bias voltage is applied only between the membrane bridge 33*a* and the signal electrode 31 of the first transmission structure connected to the first port 21 of the radiating element 2, and in such case, the bridge surface 331 with the first width in the first transmission structure 301 is in a down state, that is, the first transmission structure 301 is in a turned-off state, so the first port 21 of the radiating element 2 is electrically disconnected, i.e., in a turned-off state, the second transmission structure 302 is in a turned-on state, the second port 22 of the radiating element 2 is electrically connected, i.e., in a turned-on state, and the polarization state of the antenna is 90° linear polarization.

For example, when a DC bias is applied only to the respective membrane bridges 33*b* each having the bridge deck 331 with the second width in the second transmission structure connected to the second port 22 of the radiating element 2, it is possible to realize that the phase difference between the first port 21 and the second port 22 of the radiating element 2 is 180°, and the polarization state of the antenna realized in such case is +45° linear polarization. When no DC bias voltage is applied to the membrane bridges 33 in the first and second transmission structures 301 and 302, the phase difference between the first port 21 and the second port and 22 of the radiating element 2 is 0°, and the polarization state of the antenna is −45° linear polarization.

For example, when only the voltage input to each of a portion of the membrane bridges 33 each having the bridge deck 331 with the second width in the first transmission structure 301 connected to the first port 21 is controlled to be turned off, or when only the voltage input to each of a portion of the membrane bridges 33*b* each having the bridge deck 331 with the second width in the second transmission structure 302 connected to the second port 22 is controlled to be turned off, the phase difference between the first port 21 and the second port 22 of the radiating element 2 is ±90°, so that the agilities of the left-hand circular polarization and the right-hand circular polarization can be realized. In summary, it can be seen that the antenna shown in FIG. 10 can realize a six-polarization agile antenna with 0°/90°/45°/+45° linear polarization, left-hand circular polarization and right-hand circular polarization.

It should be noted that, the above description is made by taking the structure in which the membrane bridge 33 includes the bridge deck 331 and the first connection portion 332 and the second connection portion 333 respectively connected to the two ends of the bridge deck 331, and correspondingly, the second reference electrode 32 includes the first sub-electrode 321 and the second sub-electrode 322, as an example.

Figure 11:
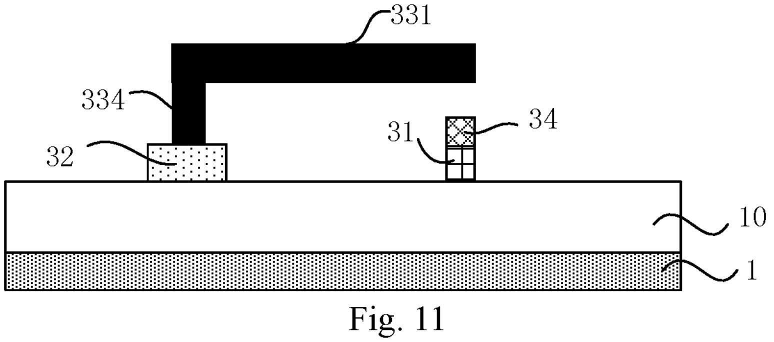
FIG. 11 is a cross-sectional view of a transmission structure according to an embodiment of the present disclosure.

In some examples, the transmission structure is not limited to the above structure, and FIG. 11 is a schematic diagram of a transmission structure according to an embodiment of the present disclosure; as shown in FIG. 11, the transmission structure includes a signal electrode 31, a second reference electrode 32, a membrane bridge 33, and an interlayer dielectric layer 34 disposed between the membrane bridge 33 and the signal electrode 31. An extending direction of the second reference electrode 32, i.e., a direction in which the second reference electrode 32 extends, is the same as an extending direction of the signal electrode 31, i.e., a direction in which the signal electrode 31 extends, and the second reference electrode 32 and the signal electrode 31 are arranged side by side. The membrane bridge 33 includes a bridge deck 331 and a connection portion 34, one end of the connection portion 34 is connected to the bridge deck 331, the other end of the connection portion 34 is disposed on a side of the second reference electrode 32 away from the substrate 10, an orthographic projection of the connection portion 34 on the substrate 10 overlaps with an orthographic projection of the second reference electrode 32 on the substrate 10, and the signal electrode 31 is located in a space defined by the bridge deck 331 and the substrate 10. In such case, the bridge surface 331 can be controlled to move toward the substrate 10 by controlling the DC bias applied between the membrane bridge 33 and the signal electrode 31, thereby realizing states of "turned-on" or "turned-off" of the transmission structure and a phase shift.

It should be noted that one or more membrane bridges 33 may be provided in the transmission structure, and in a case where one membrane bridge 33 is provided, the size of the membrane bridge 33 may be set to that shown in FIG. 1; in a case where a plurality of the membrane bridges 33 are provided, the sizes of the membrane bridges 33 may be set to those shown in FIG. 7 or FIG. 10, which will not be described again.

The interlayer dielectric layer 34 may be disposed between the second reference electrode 32 and the connection portion, or the interlayer dielectric layer 34 may not be disposed between the second reference electrode 32 and the connection portion, that is, the second reference electrode 32 and the connection portion may be in direct contact. For example, when the transmission structure is applied to the antenna shown in FIGS. 1 and 7, the interlayer dielectric layer 34 may not be disposed between the second reference electrode 32 and the connection portion, and when the transmission structure is applied to the antenna shown in FIG. 10, the interlayer dielectric layer 34 may be disposed between the second reference electrode 32 and the connection portion.

In some examples, the first reference electrode 1, the second reference electrode 32, the radiating element (radiation patch), and the membrane bridge 33 may be made of a metal such as copper or aluminum.

In some examples, the interlayer dielectric layer 34 may be selected from a dielectric material such as silicon oxide or silicon nitride.

The antenna provided by the embodiments of the present disclosure can realize 0°/90° linear polarization agile antenna, −45°/+45° linear polarization agile antenna, left-hand and right-hand circular polarization agile antennas, and six-polarization agile antenna with 0°/90°/45°/+45° linear polarization and left-hand circular polarization and right-hand circular polarization by using the transmission structure. By designing the polarization agile antennas, the number of required antennas can be greatly reduced, the size and weight of the antenna system can be reduced, and channel capacity can be increased without increasing occupied spectrum resources.

It will be understood that the above embodiments are merely exemplary embodiments adopted to illustrate the principles of the present disclosure, and the present disclosure is not limited thereto. It will be apparent to those skilled in the art that various modifications and improvements can be made without departing from the spirit and scope of the present disclosure, and such modifications and improvements are considered to be within the scope of the present disclosure.

The invention claimed is:

1. An antenna, comprising:

a substrate having a first surface and a second surface oppositely disposed;

a first reference electrode arranged on the first surface of the substrate;

a radiating element arranged on the second surface of the substrate, and feeding directions of a first port and a second port of the radiating element are different;

at least one transmission structure arranged on the second surface of the substrate, and connected to at least one of the first port and the second port of the radiating element; wherein the transmission structure comprises a signal electrode, a second reference electrode arranged on at least one side of the signal electrode in an extending direction of the signal electrode, and at least one membrane bridge; the signal electrode is configured to feed a microwave signal into the radiating element, is positioned in a space surrounded by the membrane bridge and the substrate, and is insulated from the membrane bridge through an interlayer dielectric layer; an orthographic projection of the membrane bridge on the substrate overlaps with an orthographic projection of the second reference electrode on the substrate.

2. The antenna of claim 1, wherein the first port and the second port of the radiating element are connected to transmission structures respectively.

3. The antenna of claim 2, wherein the second reference electrode comprises a first sub-electrode and a second sub-electrode, the first sub-electrode and the second sub-electrode are respectively arranged on two sides of the signal electrode in the extending direction of the signal electrode; the transmission structure comprises a bridge deck, a first connection portion and a second connection portion; one end of the first connection portion is connected to the bridge deck, and another end of the first connection portion is positioned on a side, away from the substrate, of the first sub-electrode, and an orthographic projection of the first connection portion on the substrate at least partially overlaps with an orthographic projection of the first sub-electrode on the substrate; one end of the second connection portion is connected to the bridge deck, and another end of the second connection portion is positioned on a side, away from the substrate, of the second sub-electrode, and an orthographic projection of the second connection portion on the substrate at least partially overlaps with an orthographic projection of the second sub-electrode on the substrate.

4. The antenna of claim 3, wherein the first connection portion is in contact with the first sub-electrode, and the second connection portion is in contact with the second sub-electrode.

5. The antenna of claim 2, wherein the second reference electrode is located only on one side of the signal electrode in the extending direction of signal electrode; the membrane bridge comprises a bridge deck and a connection portion, one end of the connection portion is connected with the bridge deck, and another end of the connection portion is positioned on a side, away from the substrate, of the first sub-electrode, and an orthographic projection of the connection portion on the substrate at least partially overlaps with an orthographic projection of the first sub-electrode on the substrate; or one end of the connection portion is connected with the bridge deck, another end of the connection portion is positioned on a side, away from the substrate, of the second sub-electrode, and an orthographic projection of the connection portion on the substrate at least partially overlaps with an orthographic projection of the second sub-electrode on the substrate.

6. The antenna of claim 2, wherein there is one membrane bridge provided in each transmission structure.

7. The antenna of claim 2, wherein there are a plurality of membrane bridges provided in each transmission structure, and the plurality of membrane bridges are spaced apart.

8. The antenna of claim 2, wherein there are a plurality of membrane bridges provided in each transmission structure, and one of the plurality of membrane bridges has a bridge deck with a first width, and each of the remaining membrane bridges has a bridge deck with a second width, and the first width is greater than the second width; the membrane bridges each having the bridge deck with the second width are located on a same side of the membrane bridge having the bridge deck with the first width.

9. The antenna of claim 2, wherein the feeding direction of one of the first port and the second port in the radiating element is a vertical direction, and the feeding direction of the other one of the first port and the second port in the radiating element is a horizontal direction.

10. The antenna of claim 2, wherein the radiating element, the signal electrode, the first reference electrode, the second reference electrode are arranged in a same layer.

11. The antenna of claim 1, wherein the second reference electrode comprises a first sub-electrode and a second sub-electrode, the first sub-electrode and the second sub-electrode are respectively arranged on two sides of the signal electrode in the extending direction of the signal electrode; the transmission structure comprises a bridge deck, a first connection portion and a second connection portion; one end of the first connection portion is connected to the bridge deck, and another end of the first connection portion is positioned on a side, away from the substrate, of the first sub-electrode, and an orthographic projection of the first connection portion on the substrate at least partially overlaps with an orthographic projection of the first sub-electrode on the substrate; one end of the second connection portion is connected to the bridge deck, and another end of the second connection portion is positioned on a side, away from the substrate, of the second sub-electrode, and an orthographic projection of the second connection portion on the substrate at least partially overlaps with an orthographic projection of the second sub-electrode on the substrate.

12. The antenna of claim 11, wherein the first connection portion is in contact with the first sub-electrode, and the second connection portion is in contact with the second sub-electrode.

13. The antenna of claim 1, wherein the second reference electrode is located only on one side of the signal electrode in the extending direction of signal electrode; the membrane bridge comprises a bridge deck and a connection portion, one end of the connection portion is connected with the bridge deck, and another end of the connection portion is positioned on a side, away from the substrate, of the first sub-electrode, and an orthographic projection of the connection portion on the substrate at least partially overlaps with an orthographic projection of the first sub-electrode on the substrate; or one end of the connection portion is connected with the bridge deck, another end of the connection portion is positioned on a side, away from the substrate, of the second sub-electrode, and an orthographic projection of the connection portion on the substrate at least partially overlaps with an orthographic projection of the second sub-electrode on the substrate.

14. The antenna of claim 13, wherein the connection portion is in contact with the second reference electrode.

15. The antenna of claim 1, wherein there is one membrane bridge provided in each transmission structure.

16. The antenna of claim 1, wherein there are a plurality of membrane bridges provided in each transmission structure, and the plurality of membrane bridges are spaced apart.

17. The antenna of claim 1, wherein there are a plurality of membrane bridges provided in each transmission structure, and one of the plurality of membrane bridges has a bridge deck with a first width, and each of the remaining membrane bridges has a bridge deck with a second width, and the first width is greater than the second width; the membrane bridges each having the bridge deck with the second width are located on a same side of the membrane bridge having the bridge deck with the first width.

18. The antenna of claim 1, wherein the feeding direction of one of the first port and the second port in the radiating element is a vertical direction, and the feeding direction of the other one of the first port and the second port in the radiating element is a horizontal direction.

19. The antenna of claim 1, wherein the radiating element, the signal electrode, the first reference electrode, the second reference electrode are arranged in a same layer.

20. The antenna of claim 1, wherein a material of the substrate comprises any one of glass, polyimide, and polyethylene terephthalate.

* * * * *